United States Patent [19]
Hahn

[11] Patent Number: 5,157,462
[45] Date of Patent: Oct. 20, 1992

[54] SPLIT-GAIN MULTIMODE RING LASER GYROSCOPE OUTPUT OPTICS DETECTION SYSTEM

[75] Inventor: Tae Hahn, Chatsworth, Calif.
[73] Assignee: Litton Systems, Inc., Beverly Hills, Calif.
[21] Appl. No.: 475,078
[22] Filed: Jan. 12, 1990
[51] Int. Cl.⁵ .................. G01B 9/02; H01S 3/083
[52] U.S. Cl. ............................ 356/350; 372/94
[58] Field of Search ................... 356/350; 372/94

[56] References Cited

U.S. PATENT DOCUMENTS

| | | |
|---|---|---|
| 3,320,850 | 5/1967 | Oliver ........................... 356/350 |
| 4,123,162 | 10/1978 | Sanders . |
| 4,415,266 | 9/1980 | Matthews . |
| 4,429,997 | 12/1980 | Matthews . |
| 4,449,824 | 4/1983 | Matthews . |
| 4,813,774 | 4/1988 | Dorschner . |
| 4,818,087 | 8/1982 | Dorschner . |
| 4,836,675 | 6/1987 | Hendow . |

OTHER PUBLICATIONS

Mini–Circuits, Understanding Power Splitters.
Multioscillator Laser Gyros–Weng W. Chow et al.
Laser Applications–Edited by Monte Ross.

Primary Examiner—Stephen C. Buczinski
Attorney, Agent, or Firm—L. David Rish

[57] ABSTRACT

A rotational sensing system for a split gain, multi-mode ring laser gyroscope is disclosed herein that can operate with a simple upright symmetric optics mechanism, where the required signal separation is performed fully electronically. In a preferred embodiment, signal separation circuitry is provided which performs a 180° or $\pi$ radians phase shift to one of a set of heterodyned signals, $A_{in}$, and $B_{in}$, with respect to a second set of Split Gain frequency signals, $A_{out}$ and $B_{out}$, in order to extract these Split Gain frequency signals.

12 Claims, 3 Drawing Sheets

SPLIT-GAIN MULTIMODE RING LASER GYROSCOPE OUTPUT OPTICS DETECTION SYSTEM

BACKGROUND OF THE INVENTION

1. Field of the Invention

This invention relates to ring laser gyroscope output optics detection systems, and more particularly, it relates to an output optics system for a Split Gain multioscillator sensor which provides electronic separation of heterodyned Split Gain difference frequency signals without the need for complex optical signal processing and components.

2. Description of the Related Art

The Ring Laser Gyroscope has been developed as a logical replacement for the mechanical inertial gyroscope. Based upon the principles of the Sagnac Effect, ideally the ring laser gyroscope has minimal moving parts allowing extremely accurate rotational sensing. As originally envisioned, the ring laser gyroscope has at least two counter-propagating electromagnetic waves (such as light) which oscillate within an optical ring cavity. When the ideal ring laser gyroscope is stationary, no rotation is indicated by the sensor. As the ring cavity of the laser gyroscope is rotated about its central axis, the counter-propagating waves interact so that a beat frequency is developed. A linear relationship between the beat frequency and the rotation rate of the gyroscope with respect to the inertial frame of reference may be established.

Although the ideal ring laser gyroscope is characterized by a beat note proportional to the rotational rate, the two mode planar ring laser gyroscope requires rate biasing or mechanical dithering to prevent counter propagating waves from locking at low rotation rates. Mode locking is a major difficulty at low rotation rates where the ring laser gyroscope produces a false indication that the device is not rotating. If the rotation rate of a ring laser gyroscope starts at a value above that of where lock-in occurs, and is then decreased, the frequency difference between the beams disappears at a certain input rotation. This input rotation rate is called the lock-in threshold. The range of rotation rates over which lock-in occurs is generally called the dead band of the ring laser gyroscope. Lock-in arises from the coupling of light between the beams. Today, the only means of overcoming the lock-in effect of the counter-propagating modes of light within a two mode gyroscope is to mechanically dither the mirrors or body of the gyroscope. A more detailed explanation of the problems associated with a planar two mode gyroscope are described in *Laser Applications*, edited by Monte Ross, pages 133–200 (Academic Press, 1971).

Since one of the primary benefits of a ring laser gyroscope is that it overcomes the need for mechanical or moving parts, a body dithered planar two mode gyroscope does not truly meet this goal. In an effort to achieve a fully optical ring laser gyroscope, the out-of-plane multi-mode or multioscillator ring laser gyroscope was developed to overcome the effects of mode locking without the need to dither. The terms "multimode" and "multioscillator" refer to four modes of electromagnetic energy that propagates simultaneously in the cavity as opposed to the usual pair counter-propagating linearly polarized modes that exist in the conventional two mode gyroscope. A detailed discussion of the operation of the multi-oscillator laser gyroscope is presented in the article Chow, et. al., at pages 918–936, IEEE Journal of Quantum Electronics, Vol. QE-16, No. 9, September 1980. In an effort to solve this lock-in problem, non-planar multioscillator ring laser gyroscopes have been developed, having more than one pair of counter propagating modes.

Figure 1:
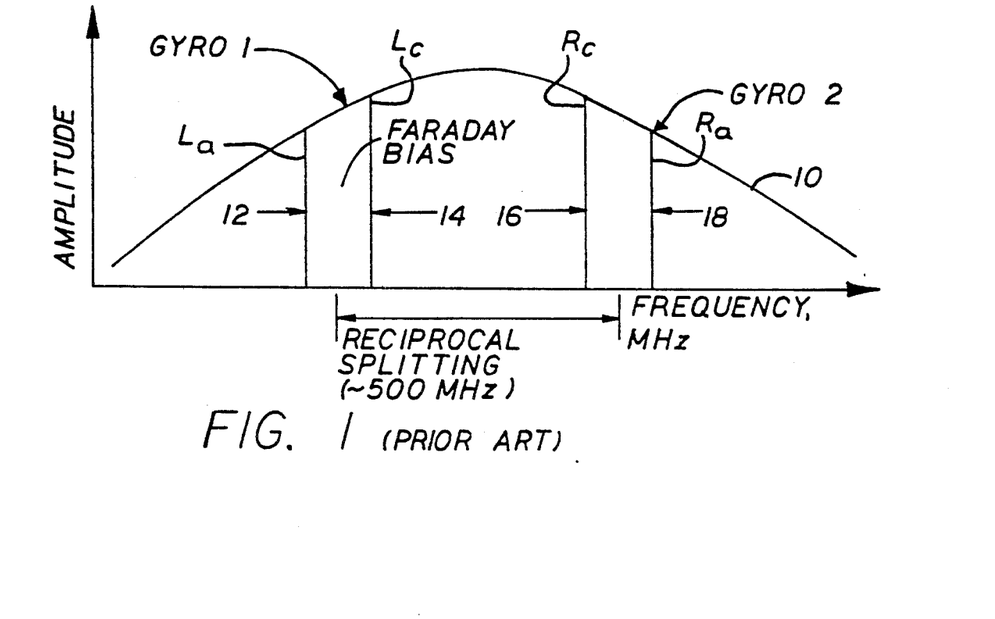
FIG. 1 is a PRIOR ART graphic representation of the Gain Profile curve for a non-planar multioscillator ring laser gyroscope having an intracavity Faraday Rotator and, showing both reciprocal and Faraday splitting of the multimode resonant frequencies of the ring laser gyroscope.

Briefly, the basic multi-oscillator ring laser gyroscope operates with left circularly polarized (LCP) and right circularly polarized (RCP) light beams and uses a Faraday effect glass device within the cavity or magnetic field on the gain plasma to provide a phase shift between the counter-propagating waves to prevent mode locking. An example of this theory of multioscillator ring laser gyroscope may be found in U.S. Pat. No. 4,818,087 entitled *ORTHOHEDRAL RING LASER GYRO* issued Apr. 4, 1989 to Raytheon Corporation (Terry A. Dorschner, inventor); and U.S. Pat. No. 4,813,774 entitled *SKEWED RHOMBUS RING LASER GYRO* issued Mar. 21, 1989 to Raytheon Corporation (Terry A. Dorschner, et. al.,inventor). The nonplanar ray path produced in a multioscillator ring laser gyroscope insures circular polarized reciprocally split light. The nonplanar ray path reciprocally rotates the polarizations by many degrees yielding the necessary high purity circular polarization. The nonplanar reciprocal phase shift also achieves two Faraday bias gyroscopes, the gain curve 10 of which is illustrated in PRIOR ART FIG. 1. The nonplanar ray path splits the light through its geometry into two separate gyroscopes, one being left circulatory polarized and the other right circulatory polarized. This splitting is known as reciprocal splitting and typically is in the range of 100 MHz–500 MHz. By placing a Faraday element in the beam path of a nonplanar ring laser gyroscope, when the proper magnetic field is applied to the Faraday glass element, nonreciprocal splitting of each gyroscope is achieved. As shown in FIG. 1, at least four modes are produced: a left circularly polarized anti-clockwise ($L_a$) frequency 12, a left circularly polarized clockwise ($L_c$) frequency 14, a right circularly polarized clockwise ($R_c$) frequency 16, and a right circularly polarized anti-clockwise ($R_a$) frequency 18. The Faraday splitting (between 12 and 14, shown as Gyro 1, and 16 and 18, shown as Gyro 2) between clockwise and anti-clockwise modes is about 1 MHz. At least four mirrors form the ring resonator path, which contains the two gyroscopes symbolized by their respective gain curves of FIG. 1. One of the mirrors is semitransparent to allow light to leave the resonator and fall upon a photo detector for signal processing. When the signals are subtracted during the electronic processing to remove the Faraday bias, the scale factor of the gyroscope is doubled over the conventional ring laser gyroscope. The nonplanar geometry multioscillator ring laser gyroscope using a Faraday element is currently designed using a gas discharge pump to provide the active medium, which medium occupies a portion of the light beam path. Reflections and backscatter from the intra-cavity element and instabilities of the magnetic field associated therewith cause difficulties that need to be overcome in order to build a fully optical navigational grade multi-oscillator ring laser gyroscope.

Figure 2:
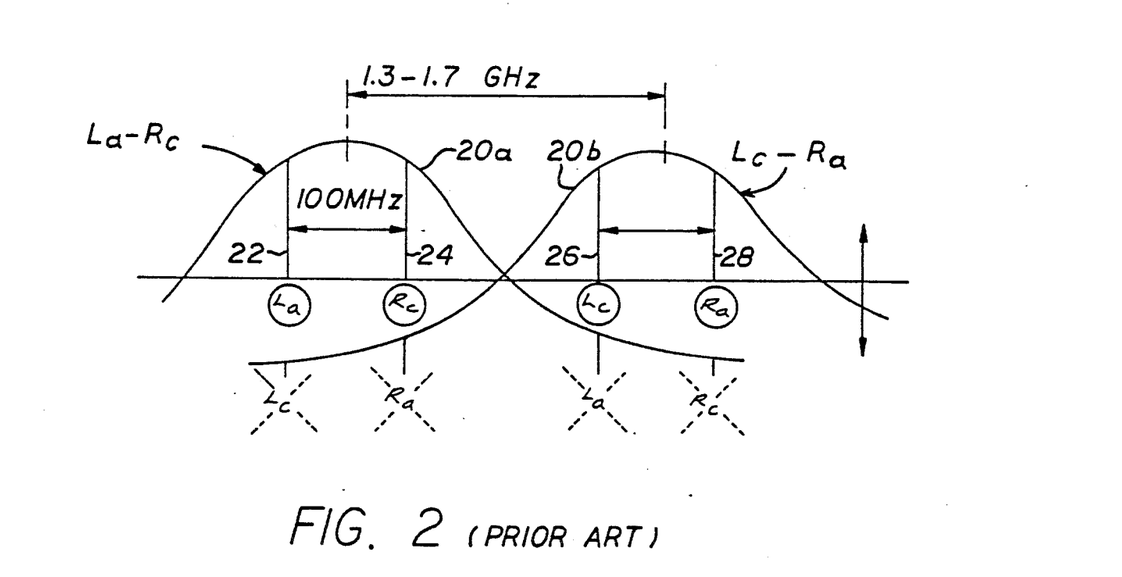
FIG. 2 is a PRIOR ART graphic representation of the Gain Profile curve for a non-planar Split-Gain multioscillator ring laser gyroscope, showing both the (q,q) and (q,q+1) longitudinal modes of the Split Gain Gyroscope, illustrating the process of mode suppression characteristic of a Split Gain Gyroscope.

FIG. 2 shows an alternative form of ring laser gyroscope, through its diagram of its gain curve 20a and 20b, which is known as the Split Gain gyroscope. This gyroscope is an important attempt to overcome the problems presented by the multioscillator ring laser gyroscope.

The Split-Gain Multimode Ring Laser Gyroscope and Method as disclosed and claimed in U.S. patent application, Ser. No. 07/115,018, filed Oct. 28, 1987 (placed under a Type One Secrecy Order). The split gain multimode ring laser gyroscope is directed to an out-of-plane multimode ring laser gyroscope, having no intra-cavity element. The split gain gyroscope includes the step of adjusting an axially applied magnetic field to a magnitude that produces a splitting between the gain curve for anti-clockwise left circularly polarized light ($L_a$) and clockwise right circularly polarized light ($R_c$) and the gain curve for clockwise left circularly polarized light ($L_c$) and anti-clockwise right polarized light ($R_a$) that is substantially equal in frequency to a multiple of the free spectral range of the cavity. Rather than operate in a single longitudinal mode as the multioscillator ring laser gyroscope of FIG. 1, the Split Gain gyroscope curves ($20a$ and $20b$ of FIG. 2) arise from two adjacent [(q,q) and (q, q+1)] longitudinal modes, each longitudinal mode setting up two separate gyroscopes within the gyroscope frame, each of these gyroscopes characterized by four modes. However, the four operating frequencies of the split gain gyroscope arise from eight possible modes present along the two adjacent longitudinal modes. The proper application of a uniform magnetic field in a gain regional of a split gain gyroscope allows one to achieve the equivalent of a Faraday bias by suppressing two of the four modes in each set of the longitudinal frequencies. By providing an axially directed magnetic field to the gain medium, the lasing action of selected modes of the cavity is suppressed by means of frequency shifting the gain curve centers, preventing frequency or mode locking.

For example, a first set of longitudinal frequencies, below Curve $20a$, (as shown in FIG. 2), namely, the left circularly polarized Clockwise ($L_c$) and the right circularly polarized Anticlockwise ($R_a$) components of a first longitudinal set (q, q mode), are suppressed in that the threshold of the gain curve $20a$ is above the lasing frequencies of these two modes. As a result, in the (q, q mode), only the left anti-clockwise circular mode $22(L_a)$ and the right clockwise circular polarized frequency $24(R_c)$ remain to laser under Curve $20a$. The opposite effect may be had in the (q,q+1 mode, Curve $20b$), so that the left circular polarized clockwise mode $26(L_c)$ and the right circular polarized anti-clockwise mode $28(R_a)$ remain. By operating over a frequency range of eight potential circular polarized frequencies ($L_a$, $R_c$, $L_c$, and $R_a$), and then suppressing four of these frequencies ($L_c$, $R_a$, $L_a$, and $R_c$), the effect of reciprocal splitting (through use of a nonplanar path) and the non-reciprocal splitting (through use of mode suppression rather than the Faraday effect) achieves an operational multioscillator ring laser gyroscope without the need for a Faraday element. Additionally, the split gain gyroscope operates so that the two respective gyroscopes (Curves $20a$ and $20b$) are separated by a Free Spectral Range (1.3–1.7 GHz) of reciprocal splitting, while each of the sets of lasing longitudinal modes ($L_a$, $R_c$ and $L_c$, $R_a$) are effectively non-reciprocally split by approximately 100 MHz, rather than 1 MHz as in Faraday biased Multioscillator ring laser gyroscopes.

In the planar ring laser gyroscope or either of these multioscillator laser gyroscope systems, it is necessary to extract a portion of each beam propagating within the laser cavity to produce two output signals, each one of which represents the difference in frequency between wave pairs having the same sense of polarization within the cavity. For example, in planar ring laser gyroscope systems, rotational information is obtained by monitoring the oppositely directed waves. In the ideal case of a uniformly rotating laser, the frequencies of the waves are slightly different.

The planar gyroscope has a device for combining its oppositely directed beams to obtain a read out which includes a dielectric mirror mounted on one side to the ring laser gyroscope body. Mounted to the opposite surface of the mirror, a prism assembly (which preferably may be an upright symmetric prism) is used to form a fringe pattern. The prism is directly mounted to the mirror to minimize vibrations.

In the planar gyroscope output optics, the fringes are a measure of the instantaneous phase difference between the oppositely directed beams. For the case when the intensities are matched and counter propagating beams are nearly collinear, the fringe pattern is stationary. When the laser gyroscope is rotated, the fringe pattern moves at the beat frequency rate. If the fringe spacing is considerably larger than the dimensions of a photodetector, a measurement of the rotation rate can be made by simply recording the rate at which the intensity maximum moves past the detectors.

The direction is which the fringe pattern moves past the detectors determines the sense of rotation. By using two detectors spaced at 90°, or a quarter fringe apart, and a logic circuit, both positive and negative counts can be accumulated to give rotation rate and sense. It should be noted that with this type of readout, the laser gyroscope is inherently an integrating rate gyroscope with a digital output. Thus, with up-down counting, the net number of accumulated counts depends only on the net angle through which the ideal gyroscope is rotated. One complete revolution of the gyroscope would produce on the order of $10^6$ counts. In summary, the output optics detection system for the planar ring laser gyroscope is relatively straight forward.

The same cannot be said for the multioscillator ring laser gyroscope. Multimode ring laser gyroscopes as known in the art may employ optical crystals and Faraday effect devices to shift the frequency of the laser beams. Heretofore, the biasing and detection schemes which have been proposed have been unduly complex and have had high noise levels associated with them. This was acknowledged as early as 1977 in U.S. Pat. No. 4,123,162 issued to Sanders and assigned to the common assignee of this application. In order to solve the problem of biasing and detecting output signals from a multioscillator ring laser gyroscope, the Sanders '162 patent was directed to a scheme of rotation direction determination through a circuit which dithered the laser plasma current, and used the AC component from the plasma power supply as a phase standard for detecting the sign or direction of rotation of the ring laser gyroscope. Sanders '162 superimposes a differential AC dithering voltage onto the DC voltage of the plasma power supply. A phase reference voltage is synchronized with the AC dither of the plasma and is applied to the synchronous demodulator 78 of Sanders '162. A slight change in the plasma current reduces one beat frequency (characteristic of one gyroscope contained within the multioscillator) and increases another beat frequency. The Sanders circuitry determines the direction of rotation by determining whether the signal is in phase or out of phase with the phase reference signal. Sanders '162 uses a single photodetector to achieve its rotation rate and rotation sense measurements. Sanders '162 also discloses a maximum intensity seeking path length control servo which is not easily adaptable by most multioscillators used due to the complex nature of the intensity curves exhibited in such a scheme.

Another scheme for rotation rate and rotational direction sensing is disclosed in the following U.S. Pat. Nos.: 4,415,266; 4,429,997; and 4,449,824, all issued to Matthews. U.S. Pat. No. '266 and U.S. Pat. No. '997 are directed to a phase-locked loop system for a multioscillator ring laser gyroscope, while the '824 patent is directed to the structure of the output optics. A complex output optics detector prism structure is disclosed by Matthews, which includes three mirrors (22, 40, and 41), a beamsplitter (42), a set of quarter-wave plates (43 and 53), a set of polarizers (44 and 54), and a set of detector diodes (45 and 55) (as shown in FIG. 2 of the 4,449,824 patent). The electronic signal processing systems disclosed in the '266 and '997 patents are used to process the heterodyned optical output signals provided by complex optics as discussed in the '824 patent. The Matthews' patents are all directed to an overall system which requires complex optics to separate the Faraday frequencies. Matthews employs a path length control system which compares the optical intensity of each Faraday signal to produce a path length control error signal. The problems which arise when using complex output optics (besides the difficulty of manufacturing a bulky mechanical structure and optical alignment) include severe optical signal attenuation, and measurement accuracy problems associated with optical signal backscatter. It therefore is desirable to provide an output optics structure and system which is free from the confinement of complex optical signal processing.

One attempt to simplify the output optics system is disclosed is U.S. Pat. No. 4,836,675, issued Jun. 6, 1989 (Martin and Hendow, inventors) and assigned to the common assignee of this application. In this case, the applicants used straight forward optics (similar to the output optics used in a dithered planar ring laser gyroscope system) and rather complex electronics to achieve the goal of measuring rotation rate and sense, as well as achieving cavity length control, in a multioscillator ring laser gyroscope system. The system that U.S. Pat. No. 4,836,675 discloses for cavity length control attempts to discriminate the amount of envelope modulation depth to determine the gyroscope's operating point, using no additional photodetectors than what is required for a planar gyroscope; however, the proposed electronic system for processing the optical output signals are rather complex, and therefore subject to signal degradation and noise, as well as higher cost implementation.

SUMMARY OF THE INVENTION

It appears from a discussion of the related Art in the Background of the Invention that a Split Gain multioscillator ring laser gyroscope output optics detection system is needed which will separate the pairs of signals derived from the optical signals in the gyroscope cavity using straight forward output optics prism and electronics.

An invention is disclosed which is directed to a split gain multi-mode ring laser gyroscope rotational sensing system, including an output optics detection system, which comprises an output prism, affixed to an output mirror of a ring resonator cavity of a split gain multimode ring laser gyroscope, suitable for heterodyning multiple frequency optical signals; a photoelectronic transducer for electronically detecting the multiple frequency optical signals; and, an electronic signal separation circuit for processing a high frequency electronic output signal corresponding to the multiple frequency optical signals. The high frequency optical signals may be grouped into pairs, each pair of signals having a clockwise component and an anti-clockwise component. (The split gain beat frequency signals are those signals which are equal to the difference between the clockwise and anti-clockwise components of each pair of high frequency optical signals derived from each of the two adjacent gain curves over which the split gain gyroscope operates, or their electronic signal counterparts, as reproduced by the photoelectronic transducer. The difference between the two split gain beat frequency signals determines the rotation rate. The direction or sense of rotation may be determined by determining which of the two split gain beat frequency signals is a higher or lower frequency with respect to the other beat frequency.)

The prism produces a heterodyned carrier optical output signal which is a function of a split gain frequency signal, in the form of a double side band suppressed carrier modulation signal; and, the heterodyned optical signal is detected by the photo-electronic transducer which provides a high frequency electronic signal to the signal separation circuit. The signal separation circuit then processes this high frequency electronic signal (corresponding to the double side band suppressed carrier modulation signal [$A_{in}$ and $B_{in}$]), and produces an output signal which is a function of the split gain frequency signals. The signal separation circuit output signal electronically separates the double side band suppressed carrier modulation signal into two split gain frequency output signal components. These components ($A_{out}$ and $B_{out}$) have a range from as low as 10 MHz and as high as 1,000 MHz, and are related to each of the split gain frequency signal components, so that rotational rate and direction may be measured.

In a preferred embodiment, the photo-electronic transducer device may include a set of at least two photodetectors separated a predetermined phasor distance apart. In further detail, the signal separation circuitry would include a set of at least two phase shifter circuits, one of each the phase shifter circuits operatively associated with one of each of the photodetectors, each of the phase shift circuits operating to phase shift the suppressed carrier modulation electronic output signal. Also, the signal separation circuits include a set of at least two combining circuits, one of each combining circuit combining a first suppressed carrier modulation electronic output signal from a first photodetector with a phase-shifted second suppressed carrier modulation electronic output signal from a second photodetector. The second of the combining circuits combines a second suppressed carrier modulation electronic output signal from a second photodetector with a phase-shifted first suppressed carrier modulation electronic output signal from a first photodetector.

In this manner, the double side band suppressed carrier modulation signal from the photo-electronic transducer is electronically separated into two component output signals, having a range from as low as 10 MHz and as high as 1,000 MHz, and corresponding to each of the split gain frequency signals, so that rotational rate and direction may be measured.

The signal separation circuitry further includes a set of at least two power splitter circuits: (1) a first power splitter circuit splitting a first suppressed carrier modulation electronic output signal from a first photodetector; and, (2) a second power splitter circuit splitting a second suppressed carrier modulation electronic output signal from a second photodetector. The first power splitter circuit is operatively associated with the second combining circuit and the second power splitter circuit is operatively associated with the first combining circuit. The double side band suppressed carrier modulation signal from the photo-electronic transducer is then separated by the power splitter circuits and recombined, after phase shifting, so that the modulation signal is separated into two component output signals, corresponding to each of the split gain frequency signals, in order to measure rotational rate and direction.

The two phase shifter circuits may be a pair of filter networks, each one of the pair of filter networks being operatively associated with one of the combining circuits, by connection in series to one input of each of the combining circuits. One of the pair of filter networks may be a low pass filter and the other filter network may be a high pass filter. A first input signal to the signal separation circuitry is then split and combined with a phase shifted ($-\pi/2$ radians) second input signal, which is phase shifted by the first filter network. The second input signal is split and combined with a phase shifted ($+\pi/2$ radians) second input signal, phase shifted by the second filter network, resulting in a $\pi$ radian phase shift of a first output signal at half of the first input signal's amplitude with respect to a second output signal, at half the second input signal's amplitude. The first and second input signals are then separated into signal separation circuitry output signals which are a function of the split gain frequency signal output components. Alternatively, the first and second filter networks may both be low pass filters.

The high pass filter network may comprise a $\pi$ (pi)-shaped filter network, having at least one capacitive element coupled at each of its terminals to one of a pair of inductive elements. The low pass filter network may comprise a $\pi$ (pi)-shaped filter network, having at least one inductive element coupled at each of its terminals to one of a pair of grounded capacitive elements. These filters operate at a range of 10 MHz to 1,000 MHz (1 GHz).

Thus, a general signal separation system for processing a heterodyned double side band suppressed carrier modulation electronic output signal is disclosed herein which operates to separate high frequency components of the suppressed carrier signal. The signal separation system includes at least two input source components for providing heterodyned suppressed carrier modulation electronic output signal in a first and second form, the first form of said suppressed carrier modulation signal being phase shifted with respect to the second form of said signal. (In a ring laser gyroscope these input source components are the photodetectors.)

This signal separation system includes a set of at least two phase shifter circuits, one of each of the two phase shifter circuits operating to further phase shift the suppressed carrier modulation electronic output signal by a predetermined phase. The system also includes a set of at least two combining circuits, one of each combining circuit combining a first suppressed carrier modulation electronic output signal in the first form with a phase-shifted second suppressed carrier modulation electronic output signal in the second form; and, a second of the two combining circuits combining a second suppressed carrier modulation electronic output signal in a second form with a phase-shifted first suppressed carrier modulation electronic output signal in the first form. The signal separation system for processing a heterodyned double side band suppressed carrier modulation electronic output signal additional includes a set of at least two power splitter circuits, a first of the two power splitter circuits splitting the first suppressed carrier modulation electronic output signal in a first form; and, a second of the power splitter circuits splitting the second suppressed carrier modulation electronic output signal in a second form. The first power splitter circuit is operatively associated with the second combining circuit and the second power splitter circuit is operatively associated with the first combining circuit. By such a system, the double side band suppressed carrier modulation signal is separated by said power splitter circuits and recombined, after phase shifting, so that said modulation signal is separated into two component output signals.

DETAILED DESCRIPTION OF THE PREFERRED EMBODIMENT

Figure 3:
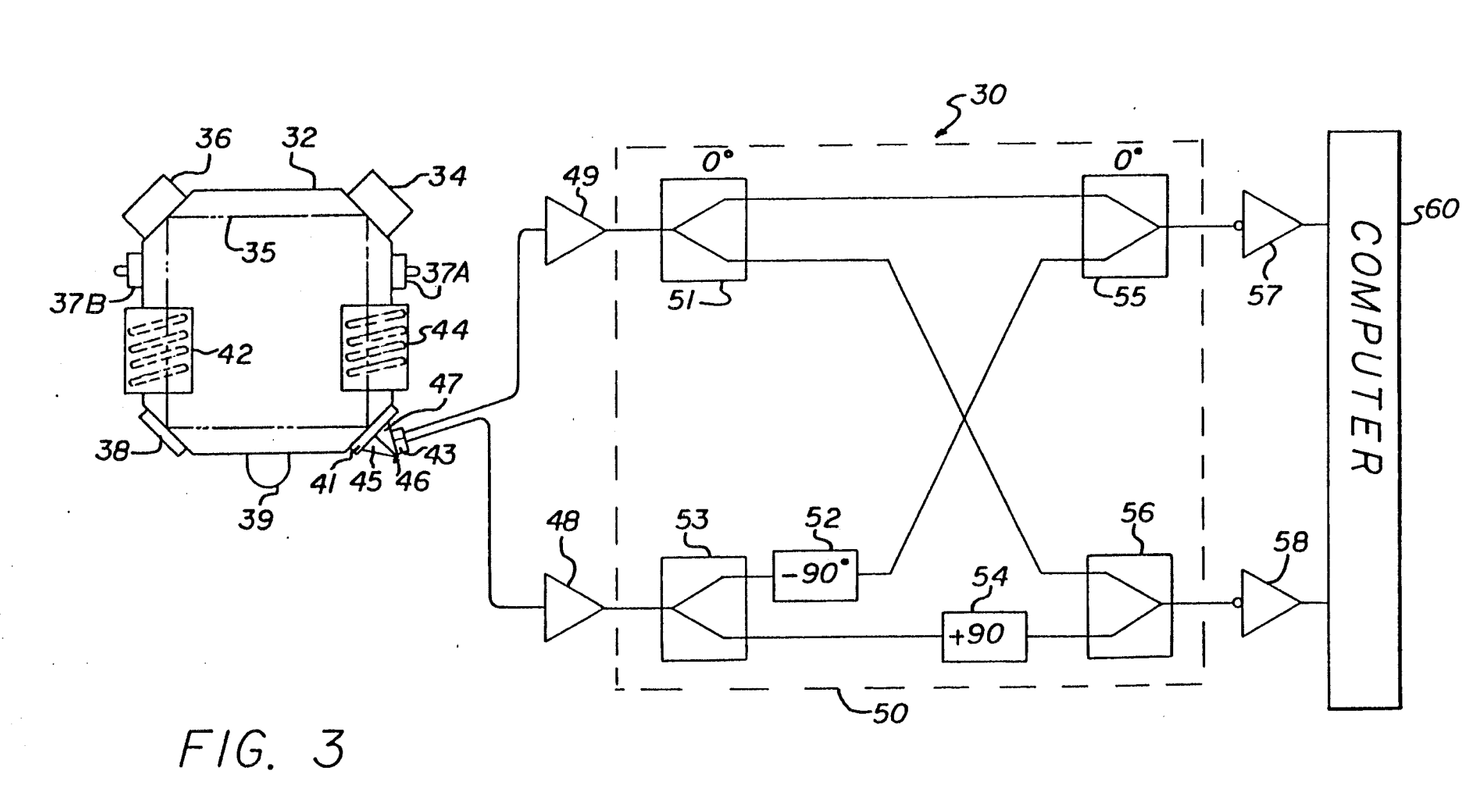
FIG. 3 is a schematic diagram of a preferred embodiment of the Rotational Sensing system for a Split Gain multi-mode ring laser gyroscope including the output optics detection system of this invention.
Figure 4:
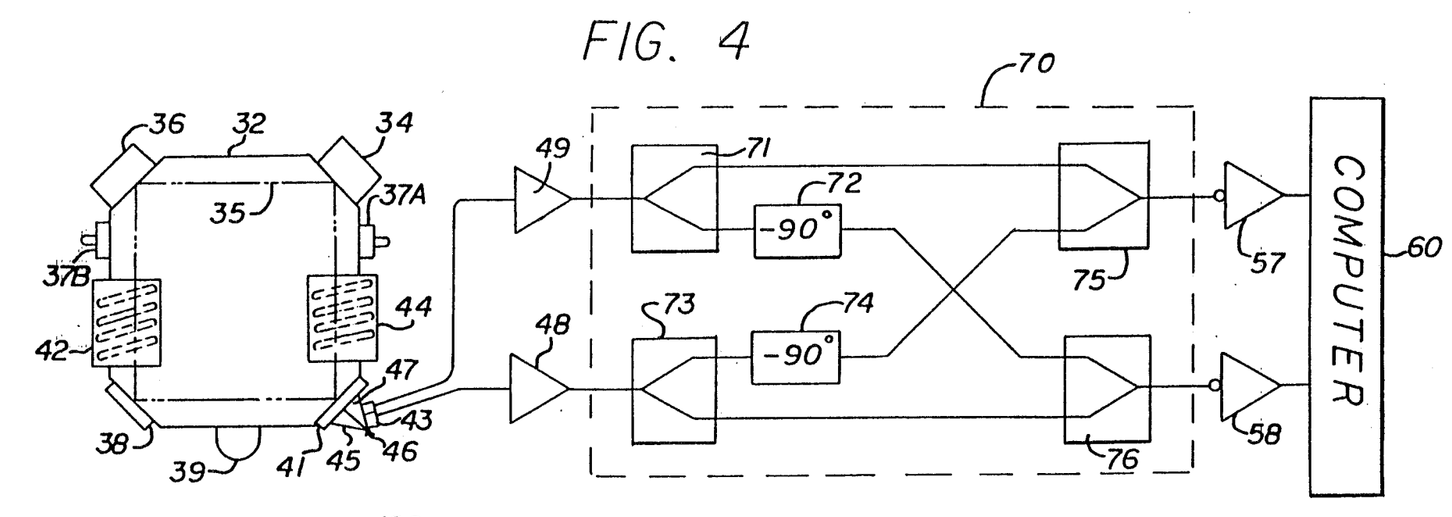
FIG. 4 is a schematic diagram of an alternative embodiment of the Rotational Sensing system for a Split Gain multi-mode ring laser gyroscope including the output optics detection system of this invention.

With reference to FIG. 3, there is disclosed an output optics detection system 30 for detecting and decoding the optical signal rotational and rate information provided by the upright symmetric prism assembly 46 of the split gain multioscillator ring laser gyroscope. The split gain multioscillator ring laser gyroscope is comprised of a monlithic block or frame 32 made from a single material glass such as ZERODUR made by Schott of West Germany. The frame contains an optical pathway 35 defined slightly non-planar by four corner mirrors 34, 36, 38, and 41. An active medium of excited Helium-Neon Gas is provided by activation of the cathode 39 and anodes 37A and 37B. Reciprocal splitting of the light beams travelling along the optical pathway 35 is provided by the nonplanar geometry of the gyroscope, providing left and right reciprocal circularly polarized light (RCP) and (LCP). (The nonplanar configuration is achieved by slightly folding the optical pathway 15 along an imaginary fold line (not shown) connecting opposing corner mirrors 34 and 38.) "Splitting" between clockwise and anti-clockwise components of each set of LCP and RCP light is achieve by the application of strong magnetic fields from field coils electro-magnets 42 and 44 for activating the mode suppression mechanism characteristic of the Split Gain Effect. This "splitting" between clockwise and anti-clockwise components of the two gyroscopes within the monolithic frame 32 is on the order of one hundred megahertz (100 MHz), with a range of 10 MHz to 1 GHz. The readout optics prism system includes of a pair of upright symmetric prisms 45 and 47 joined in such a fashion to produce the single upright symmetric prism assembly 46 which is mounted upon semi-transparent mirror 41; and, a set of photodetectors 43. The common vertical surface between prisms 45 and 47 reflects about 50% of the incident light and the opposite diagonal surfaces on each prism 45 and 47 have reflective areas adjacent to a photodetector. The preferred arrangement for aligning the two photodetectors 43 is shown in FIGS. 3 and 4. Both photodetectors 43 are positioned along the same diagonal surface of one of the upright prisms, because matching of such monolithic devices is nearly ideal over temperature and the free, opposite diagonal surface can be used for gyroscope diagnostics after assembly.

The signal separation circuitry 30 shown in FIG. 3, and the signal separation circuitry 70 of FIG. 4, are functional embodiments which performs the same function that has been previously been accomplished using stacked quarterwave plates and optical polarizers. The temperature stability and alignment problems with the prior art optical stack are significant drawbacks of such a scheme, making the embodiment shown in FIG. 3 preferable as an all electronic system. The preferred embodiment, as shown in FIG. 3 ( and the alternative embodiment as shown in FIG. 4), achieves a temperature stable, easily-aligned signal separation means capable of extracting the frequency differences between counter-propagating light beams in the gyroscope cavity. This frequency difference, between the frequencies 24 ($R_c$) and 22 ($L_a$), and 28 ($R_a$) and 26 ($L_c$), respectively, is a function of the amount of "Splitting" of the Gain produced by the Magnetic Field coil assemblies 42 and 44 and the rotation rate of the gyroscope. In general, the frequencies present at the circuit outputs (($A_{out}$ and $B_{out}$) in FIGS. 3 and 4) will be identical at zero rotation rate. $A_{in}$ is the heterodyned optical signal detected at a first photodetector of the photodetectors 43 and is presented to the preamplifiers 49 of FIGS. 3 and 4. $B_{in}$ is also a heterodyned optical signal from a second photodetector of the photodetectors 43 and is presented to the pre-amplifiers 48 of 3 and 4. $A_{out}$ is a separated output signal provided by the signal separation circuit 30 in FIG. 3 (and the signal separation circuit 70 in FIG. 4) to the gain amplifiers 57 of FIGS. 3 and 4. $B_{out}$ is a separated output signal provided by the signal separation circuit 30 in FIG. 3 (and the signal separation circuit 70 in FIG. 4) to the gain amplifiers 58 of FIGS. 3 and 4. A rotation rate other than zero causes one output (for example, $A_{out}$) to become higher and the other ($B_{out}$) to become lower. Higher rotation rates produce proportionally greater frequency differences between outputs. Reversing the rotation direction causes the other difference frequency ($B_{out}$) to become the higher frequency. Normally, there is only a single frequency present on each output at any particular rotation rate.

In order to understand the function of circuits shown in FIGS. 3 and 4, it is helpful to formulate equations for current from the photodetectors depicted in [FIGS. 3 and 4] as follows:

Regarding the Embodiment in FIG. 3:

$$A_{in} = S_1 \cos W_1 t + S_2 \cos W_2 t \quad \text{EQ 1}$$

$$\begin{aligned}A_{out} &= \tfrac{1}{2}[S_1 \cos W_1 t + S_2 \cos W_2 t] + \\ &\quad \tfrac{1}{2}[S_1 \cos(W_1 t + \pi/2 - \pi/2)] + \tfrac{1}{2}[S_2 \cos(W_2 t - \pi/2 - \pi/2)]; \\ &= \tfrac{1}{2} S_1 \cos W_1 t + \tfrac{1}{2} S_2 \cos W_2 t + \\ &\qquad \tfrac{1}{2} S_1 \cos(W_1 t) - \tfrac{1}{2} S_2 \cos(W_2 t); \\ \text{whereby, } A_{out} &= S_1 \cos W_1 t.\end{aligned} \quad \text{EQ 3}$$

Also,
$$\begin{aligned}B_{out} &= \tfrac{1}{2}[S_1 \cos W_1 t + S_2 \cos W_2 t] + \\ &\quad \tfrac{1}{2}[S_1 \cos(W_1 t + \pi/2 + \pi/2)] + \tfrac{1}{2}[S_2 \cos(W_2 t - \pi/2 + \pi/2)]; \\ &= \tfrac{1}{2} S_1 \cos W_1 t + \tfrac{1}{2} S_2 \cos W_2 t - \\ &\qquad \tfrac{1}{2} S_1 \cos(W_1 t) - \tfrac{1}{2} S_2 \cos(W_2 t); \\ \text{whereby, } B_{out} &= S_2 \cos W_2 t.\end{aligned} \quad \text{EQ 4}$$

With regard to FIG. 4, please note the following:

$$A_{in} = S_1 \cos W_1 t + S_2 \cos W_2 t \quad \text{EQ 5}$$

$$B_{in} = S_1 \cos(W_1 t + \pi/2) + S_2 \cos(W_2 t - \pi/2) \quad \text{EQ 6}$$

$$\begin{aligned}A_{out} &= \tfrac{1}{2}[S_1 \cos W_1 t + S_2 \cos W_2 t] + \\ &\quad \tfrac{1}{2}[S_1 \cos(W_1 t + \pi/2 - \pi/2)] + \tfrac{1}{2}[S_2 \cos(W_2 t - \pi/2 - \pi/2)]; \\ &= \tfrac{1}{2} S_1 \cos W_1 t + \tfrac{1}{2} S_2 \cos W_2 t + \\ &\qquad \tfrac{1}{2} S_1 \cos(W_1 t) - \tfrac{1}{2} S_2 \cos(W_2 t); \\ \text{whereby, } A_{out} &= S_1 \cos W_1 t.\end{aligned} \quad \text{EQ 7}$$

Also,
$$\begin{aligned}B_{out} &= \tfrac{1}{2}[S_1 \cos(W_1 t - \pi/2) + S_2 \cos(W_2 t - \pi/2)] + \\ &\quad \tfrac{1}{2}[S_1 \cos(W_1 t + \pi/2)] + \tfrac{1}{2}[S_2 \cos(W_2 t - \pi/2)]; \\ &= \tfrac{1}{2} S_1 \cos(W_1 t - \pi/2) + \tfrac{1}{2} S_2 (\cos W_2 t - \pi/2) + \\ &\quad \tfrac{1}{2}[S_1 \cos(W_1 t + \pi/2)] + \tfrac{1}{2}[S_2 \cos(W_2 t - \pi/2)]; \\ &= -\tfrac{1}{2} S_1 \sin(W_1 t) + \tfrac{1}{2} S_2 (\cos W_2 t - \pi/2) + \\ &\qquad \tfrac{1}{2} S_1 \sin(W_1 t) + \tfrac{1}{2}[S_2 \cos(W_2 t - \pi/2)]; \\ \text{whereby, } B_{out} &= S_2 \cos W_2 t.\end{aligned} \quad \text{EQ 8}$$

Signals $A_{in}$ and $B_{in}$ are presented to the signal separation circuit 50 of FIG. 3 (and to the signal separation circuit 70 of FIG. 4) along the input terminals of the preamplifiers 48 and 49, leading away from the photodetectors 43. The signals ($A_{in}$ and $B_{in}$) are thereby presented to the pre-amplifiers 48 and 49 for further processing as boosted gain signals. These signals (along the electrical pathways leading through input terminals to the pre-amplifiers) represent an electronic analog of, and correspond to, the optically heterodyned output signal present at the diagonal surface of the upright symmetric prism and mirror assembly 46.

It is a function of the present invention to electronically separate the Split Gain beat frequencies (those signals which are equal to the difference between the clockwise and anti-clockwise components of each pair of high frequency optical signals, or their electronic signal counterparts, as produced by the photoelectronic transducer in 43), so that a count number or other signal representing the present rate of rotation experienced by the ring laser gyroscope may be obtained.

With reference to FIG. 3 only, the heterodyned signals ($A_{in}$ and $B_{in}$) proceed through the signal separation circuitry 50 from the output of the pre-amplifiers 48 and 49 to the electronic 0° Power Splitters 51 and 53. An example of a 0° Power Splitter/Combiner that may be used in the separation circuit 50 includes Part Model No. TSC-2 manufactured by the Mini-Circuits company, P.O. Box 350166, Brooklyn, N.Y. 11235-0003. From the 0° Power Splitters 51 and 53, the signals are split, traveling through different circuit routing for recombination at the 0° Power Combiners 55 and 56. A component of each of the input signals is routed respectively to the +90° (or +π/2 radians) and −90° (−π/2 radians) phase shifters 52 and 54, for combining with the other, non-phase shifted component from the other of two photodetectors. Each heterodyned signal (in a form shown in Equation 3) is also presented with no phase shift to an input of terminal of the 0° Power Combiners 55 and 56. The combined output from each 0° Power Combiner 55 and 56 is then presented to the respective Gain amplifiers 57 and 58, which then provides the separated signals to the Computer 60 for processing.

In a like manner, the signal separation circuit 70 of FIG. 4 operates to separate and process the input heterodyned signals ($A_{in}$ and $B_{in}$), except that two Low Pass Filters (for shifting the phase of signals a −90° (or −π/2 radians), such as phase shifters 72 and 74, are used for phase shifting rather than a single High Pass Filter and a Single Low Pass Filter, as in the preferred embodiment shown in FIG. 3. The 0° Power Splitters 71 and 73, and the 0° Power Combiners 75 and 76 function in a manner similar to their counterparts 51,53 and 55,56 of FIG. 3.

Figure 5:
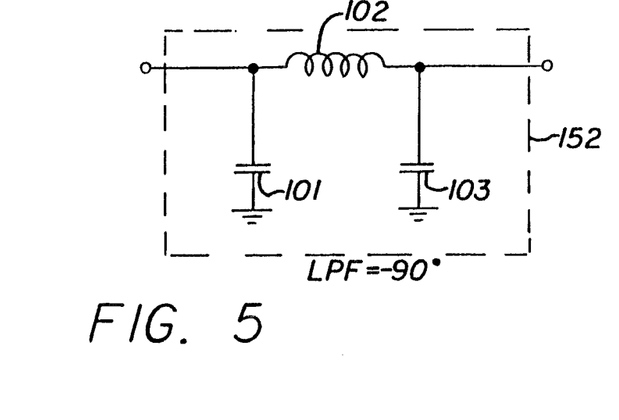
FIG. 5 is a preferred embodiment of the detailed circuitry 152, corresponding to the low pass filter network 52 shown in FIG. 3.
Figure 6:
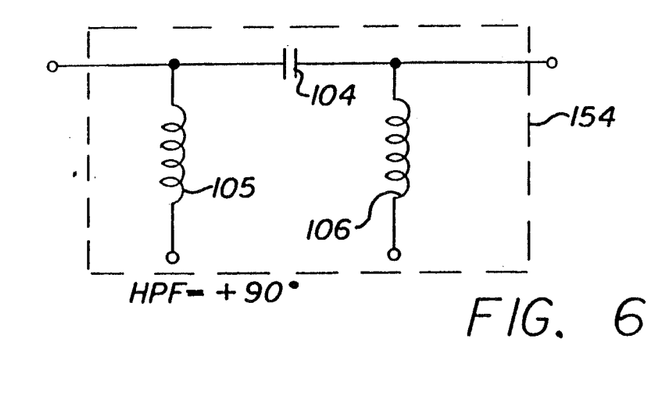
FIG. 6 is a preferred embodiment of the detailed circuitry 154, corresponding to the high pass filter network 54 shown in FIG. 3.

With reference to FIGS. 5 and 6, preferred detailed embodiment circuits for the phase shifters 152 and 154 (counterparts to phase shifters 52 and 54 of FIG. 3) are shown. Low Pass Filter phase shifter 152 achieves a −90° (or −π/2 radians) phase shift by use of a π (pi) shaped network comprised of an inductive element 102 coupled at each of its terminals to one of a pair of grounded capacitive elements 101 and 103.

With reference to FIG. 6, the High Pass Filter phase shifter 154 achieves a +90° (or +π/2 radians) phase shift by use of a π (pi) shaped network comprised of a capacitive element 104 coupled at each of its terminals to one of a pair of grounded inductive elements 105 and 106.

Thus, there has been disclosed a split gain multi-mode ring laser gyroscope output optics rotational sensing system that can operate with a simple upright symmetric optics scheme where the required signal separation is performed fully electronically. While a preferred and alternative embodiments for performing rotation sensing have been disclosed, it can be seen that other equivalent alternative embodiments may also be apparent. For example, other types of phase shifters may accomplish the desired results besides the π (pi) shaped networks disclosed. Other types of phase shifters includes coaxial and strip transmission lines in lengths of a quarterwave of the resonant frequency being shifted. Also, other transmission lines or strips may be used to replace the high frequency component splitters and combiners disclosed. Thus, it is apparent that the appended claims which follow are intended to cover not only the embodiments described in this application, but alternative equivalents as well.

What is claimed is:

1. In a split gain multi-mode ring laser gyroscope, an output optics detection system for sensing the rotational rate of said gyroscope, comprising:

an output prism, affixed to an output mirror of a ring resonator cavity of a split gain multi-mode ring laser gyroscope, for heterodyning multiple frequency optical signals, said signals being grouped into pairs of right and left circularly polarized light, each polarized pair of signals having a clockwise component and an anti-clockwise component, the output from said prism being a heterodyned carried multiple frequency optical signal;

photo-electronic transducer means receiving said heterodyned multiple frequency optical signal and converting said signal into a heterodyned electronic signal;

said prism producing an output signal which is a heterodyned carried multiple frequency optical signal, said optical signal being a function of a split gain frequency signal, in the form of a double side band suppressed carrier modulation signal, electronically detectable by said photo electronic transducer means;

electronic signal separation means for processing a high frequency electronic output signal, corresponding to said double band suppressed carried modulation signal from said photo-electronic transducer means, said output signal being a function of said split gain frequency signal;

whereby, the double side band suppressed carrier modulation signal from said photo-electronic transducer means is electronically separated into clockwise and anti-clockwise component output signals of at least one of said polarized pairs, said components having a range from as low as 10 MHz and as high as 1,000 MHz, and corresponding to each of the split gain frequency signals, so that rotational rate and direction may be measured.

2. The split gain multi-mode ring laser gyroscope rotational sensing system of claim 1, wherein:

said photo-electronic transducer means includes a set of at least two photodetectors separated a predetermined distance apart, providing said suppressed carrier modulation electronic output signal; and, said electronic signal separation means for processing said suppressed carrier modulation electronic output signal includes:

a set of at least two phase shifter circuits, one of each of said at least two phase shifter circuits operatively associated with one of each of said at least two photodetectors, each of said phase shift circuits operating to phase shift said suppressed carrier modulation electronic output signal;

a set of at least two combining circuits, one of each combining circuit combining a first suppressed carrier modulation electronic output signal from a first photodetector with a phase-shifted second suppressed carrier modulation electronic output signal from a second photodetector; and, a second of said at least two combining circuits combining a second suppressed carrier modulation electronic output signal from a second photodetector with a phase-shifted first suppressed carrier modulation electronic output signal from a first photodetector;

whereby said double side band suppressed carrier modulation signal from said photo-electronic transducer means is electronically separated into clockwise and anti-clockwise component output signals of at least one of said polarized pairs, having a range from as low as 10 MHz and as high as 1,000 MHz, and corresponding to each of the split gain frequency signals, so that rotational state and direction may be measured.

3. The split gain multi-mode ring laser gyroscope rotational sensing system of claim 2, said electronic signal separation means for processing said suppressed carrier modulation electronic output signal, further including:

a set of at least two power splitter circuits, a first of said at least two power splitter circuits splitting a first suppressed carrier modulation electronic output signal from a first photodetector;

a second of said at least two power splitter circuits splitting a second suppressed carrier modulation electronic output signal from a second photodetector;

said first power splitter circuit operatively associated with said second combining circuit and said second power splitter circuit operatively associated with said first combining circuit;

whereby, said double side band suppressed carrier modulation signal from said photo-electronic transducer means is separated by said power splitter circuits and recombined, after phase shifting, so that said modulation signal is separated into two component clockwise and anti-clockwise output signals of at least one of said polarized pairs, corresponding to each of the split gain frequency signals, in order to measure rotational rate and direction.

4. The split gain multi-mode ring laser gyroscope rotational sensing system of claim 3, wherein:

said set of at least two phase shifter circuits includes:

at least two filter networks, each one of said filter networks operatively associated with one of said combining circuits, by connection in series to one input of each of the combining circuits; and, a first of said filter networks being a low pass filter and a second of said filter networks being a high pass filter;

whereby, a first input signal to said signal separation means is split and combined with a phase shifted ($-\pi/2$ radians) second input signal, phase shifted by said first filter network, and said second input signal is split and combined with a phase shifted ($+\pi/2$ radians) second input signal, phase shifted by said second filter network, resulting in a $\pi$ radian phase shift of a first output signal at half of the first input signal's amplitude with respect to a second output signal, at half the second input signal's amplitude; said first and second input signals being separated into their respective split gain frequency signal components allowing determination of gyroscope rotation and rotational direction.

5. The split gain multi-mode ring laser gyroscope rotational sensing system of claim 3, wherein:

said set of at least two phase shifter circuits includes:

at least two filter networks, each of said filter networks operatively associated with one of said combining circuits, by connection in series to one input of each of the combining circuits; and, a first and a second networks of said filter networks, both being low pass filters;

whereby, a first input signal to said signal separation means is split, phase shifted by said first filter network ($-\pi/2$ radians), and combined with a second input signal, a second input signal to said signal separation means is split, phase shifted by said second filter network ($-\pi/2$ radians), and combined with said first input signal, resulting in a $\pi$ radian phase shift of a first output signal at half of the first input signal's amplitude with respect to a second output signal, at half the second input signal's amplitude; said first and second input signals being separated into their respective split gain frequency signal components allowing determination of gyroscope rotation and rotational direction.

6. The split gain multi-mode ring laser gyroscope rotational sensing system of claim 4, wherein:

said high pass filter network comprises:

a $\pi$ (pi)-shaped filter network, having at least one capacitive element coupled at each of its terminals to one of a pair of inductive elements;

whereby, a phase shifter output signal is provided that is phase shifted ($+\pi/2$ radians) with respect to a phase shifter input signal.

7. The split gain multi-mode ring laser gyroscope rotational sensing system of claim 4, wherein:

said low pass filter network comprises:

a $\pi$ (pi)-shaped filter network, having at least one inductive element coupled at each of its terminals to one of a pair of grounded capacitive elements;

whereby, a phase shifter output signal is provided that is phase shifted ($-\pi/2$ radians) with respect to a phase shifter input signal.

8. The split gain multi-mode ring laser gyroscope rotational sensing system of claim 5, wherein:

said low pass filter network comprises:

a $\pi$ (pi)-shaped filter network, having at least one inductive element coupled at each of its terminals to one of a pair of grounded capacitive elements;

whereby, a phase shifter output signal is provided that is phase shifted ($-\pi/2$ radians) with respect to a phase shifter input signal.

9. A signal separation system for processing a heterodyned double side band suppressed carrier modulation electronic output signal, comprising:

at least two input source components for providing said heterodyned suppressed carrier modulation electronic output signal in a first and second form, said first form of said suppressed carrier modulation signal being phase shifted with respect to said second form of said signal;

a set of at least two phase shifter circuits for receiving at least one of said input source components, one of each of said at least two phase shifter circuits operating to further phase shift said suppressed carrier modulation electronic output signal by a predetermined phase;

a set of at least two combining circuits, one of each combining circuit combining a first suppressed carrier modulation electronic output signal in said first form with a phase-shifted second suppressed carrier modulation electronic output signal in said second form; and, a second of said at least two combining circuits combining a second suppressed carrier modulation electronic output signal in a second form with a phase-shifted first suppressed carrier modulation electronic output signal in a first form;

whereby said double side band suppressed carrier modulation signals in the first and second forms are electronically separated into two component clockwise and anti-clockwise output high frequency signals.

10. The signal separation system for processing a heterodyned double side band suppressed carrier modulation electronic output signal of claim 9, further comprising:

a set of at least two power splitter circuits, a first of said at least two power splitter circuits splitting said first suppressed carrier modulation electronic output signal in a first form;

a second of said at least two power splitter circuits splitting said second suppressed carrier modulation electronic output signal in a second form;

said first power splitter circuit operatively associated with said second combining circuit and said second power splitter circuit operatively associated with said first combining circuit;

whereby, said double side band suppressed carrier modulation signals in the first and second forms are separated by said power splitter circuits and recombined, after phase shifting, so that said modulation signal is separated into two component clockwise and anti-clockwise output signals.

11. The signal separation system for processing a heterodyned double side band suppressed carrier modulation electronic output signal of claim 10, wherein:

said set of at least two phase shifter circuits further includes:

at least two filter networks, each one of said filter networks operatively associated with one of said combining circuits, by connection in series to one input of each of the combining circuits; and, a first of said filter networks being a low pass filter and a second of said filter networks being a high pass filter;

whereby, a first input signal to said signal separation means is split and combined with a phase shifted ($-\pi/2$ radians) second input signal, phase shifted by said first filter network, and said second input signal is split and combined with a phase shifted ($+\pi/2$ radians) second input signal, phase shifted by said second filter network, resulting in a $\pi$ radian phase shift of a first output signal at half of the first input signal's amplitude with respect to a second output signal, at half the second input signal's amplitude; said first and second input signals being separated into respective output signal components.

12. The signal separation system for processing a heterodyned double side band suppressed carrier modulation electronic output signal of claim 10, wherein:

said set of at least two phase shifter circuits further includes:

at least two filter networks, each of said filter networks operatively associated with one of said combining circuits, by connection in series to one input of each of the combining circuits; and, a first and a second networks of said filter networks, both being low pass filters;

whereby, a first input signal to said signal separation means is split, phase shifted by said first filter network ($-\pi/2$ radians), and combined with a second input signal, a second input signal to said signal separation means is split, phase shifted by said second filter network ($-\pi/2$ radians), and combined with said first input signal, resulting in a $\pi$ radian phase shift of a first output signal at half of the first input signal's amplitude with respect to a second output signal, at half the second input signal's amplitude; said first and second input signals being separated into their respective output signal components.

* * * * *